June 16, 1925.

W. H. PALMER ET AL

DRILL ROD JOINT CONNECTION

Filed June 20, 1921

1,542,266

INVENTORS
WILLIAM H. PALMER
EDWARD W. PALMER
BY A.B.Bowman
ATTORNEY

Patented June 16, 1925.

1,542,266

UNITED STATES PATENT OFFICE.

WILLIAM H. PALMER AND EDWARD W. PALMER, OF SAN DIEGO, CALIFORNIA.

DRILL-ROD-JOINT CONNECTION.

Application filed June 20, 1921. Serial No. 478,939.

*To all whom it may concern:*

Be it known that we, WILLIAM H. PALMER and EDWARD W. PALMER, of the United States, residing at San Diego, in the county of San Diego and State of California, have invented a certain new and useful Drill-Rod-Joint Connection, of which the following is a specification.

Our invention relates to a means for connecting the joints of sectional drill rods and the objects of our invention are; first, to provide a connection for the joints of drill rods which is positive in its action and will not permit the drill rod sections to come apart at the joint; second, to provide a novelly constructed drill rod joint connection; third, to provide a device of this class in which the joint is locked by means of a lock plug and fourth, to provide a device of this class which is very simple and economical of construction, durable, easy to install, positive in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of references thereon which form a part of this specification in which:—

Figure 1:
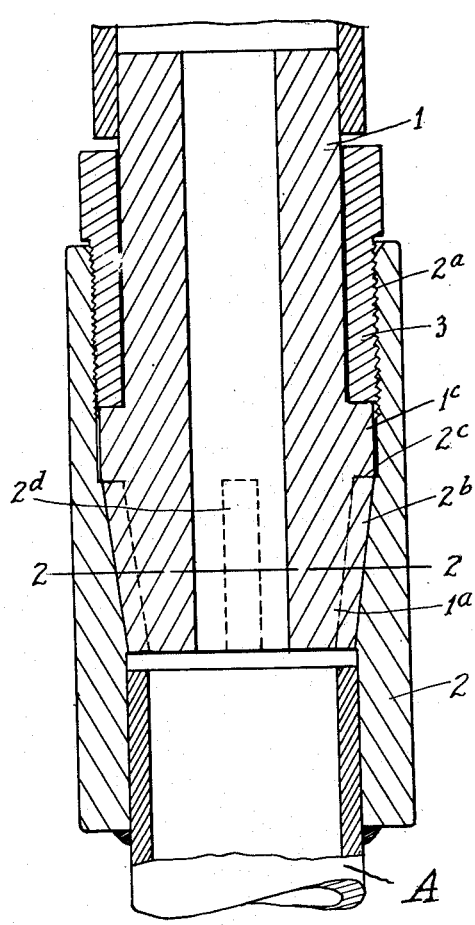
Figure 2:
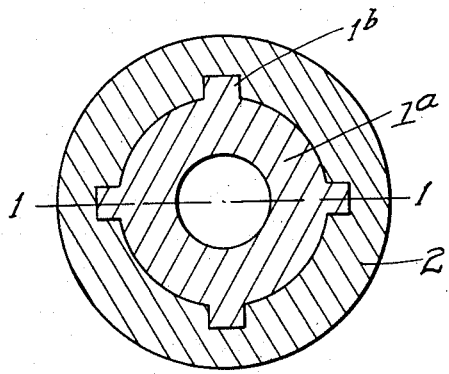
Figure 3:
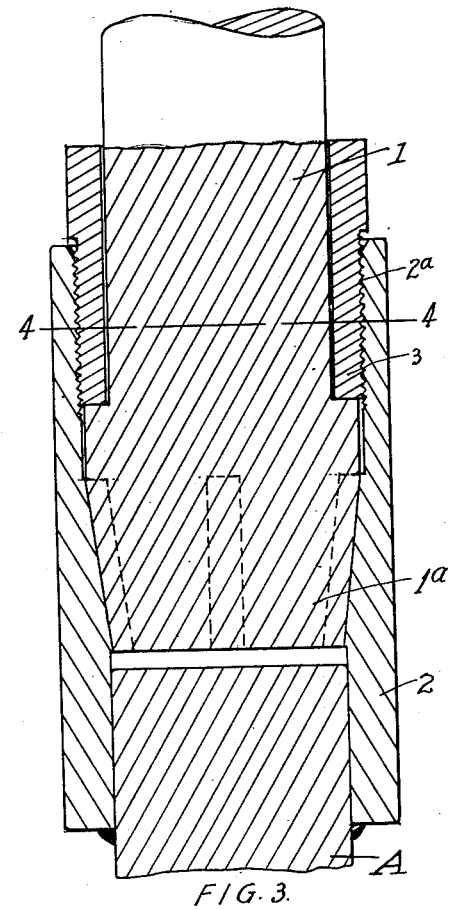
Figure 4:
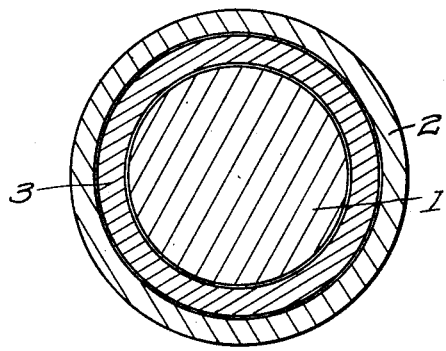

Figure 1, is a longitudinal sectional view of a tool joint connection showing the device fragmentarily and hollow in form for hydraulic purposes. Fig. 2 is a sectional view through 2—2 of Fig. 1. Fig. 3 is a longitudinal sectional view of our tool joint shown solid and not to be used for hydraulic purposes and Fig. 4 is a transverse sectional view thereof through 4—4 of Fig. 3.

Similar characters of reference refer to similar parts and portions throughout the several views of the drawings.

The internal connecting member 1, external connecting member 2 and lock bushing 3 constitute the principal parts and portions of our drill rod joint connection.

The external connection member 2 is a hollow member as shown best in Figs. 1 and 2 of the drawings. It is provided in one end with threads $2^a$ adapted for the bushing 3 and with a decreased diameter portion $2^b$ forming a shoulder $2^c$. This decreased diameter portion $2^b$ is tapered, decreasing in diameter downwardly and this portion is provided with a plurality of slots $2^d$. In this case we have shown 4. The other end of this member 2 from the threads $2^a$ is of smaller internal diameter than the threaded portion but of larger diameter than the lower end of the portion $2^b$. Secured in this lower end of the portion 2 is the drill rod A. It is rigidly secured thereto by shrinking thereon or by any means for rigidly securing it to the same. Mounted in this member 2 is the internal connection member 1, the inner end of which is tapered conforming to the taper on the portion $2^b$ and it is provided with a plurality of outwardly extending tapered lug portions $1^b$ which conform to the grooves $2^d$ in the member 2 and fit therein, locking the members against torsional movements relatively to each other. This member 1 is provided with an outwardly extending flange $1^c$, the one side of which is adapted to rest against the shoulder $2^c$, when fitted tightly therein, in which position the portion $1^a$ fits snugly into the portions $2^b$ and the lugs $1^b$ fit snugly into the grooves $2^d$. This member 1 is held rigidly in position in the member 2 by means of the bushing 3 which is adapted to revolve around the member 1 but is externally threaded adapted for the internal threads in the member 2. This bushing is screwed down tightly against the one side of the flange $1^c$. This member 3, it will be noted serves to secure the member 1 rigidly into the member 2 and the lugs $1^b$ in the grooves $2^d$ prevent the members 1 and 2 from turning relatively to each other. Thus it will be noted that the drill rod may be turned in either direction without in any way affecting the joint, and that the joint is as secure and rigid in either direction. On the other end of the member 1 the drill rod is secured by shrinking thereon or by any other means for rigidly securing it thereto.

In the modified form of construction as shown in Figs. 3 and 4 of the drawing it will be noted that the member 1 is not hollow but solid showing the application of the device to either a solid or hollow drill rod.

Though we have shown and described a particular construction, combination and arrangement of parts and portions and certain modifications thereof, we do not wish to be limited to this particular construction, combination and arrangement, nor to the modification thereof, but desire to include in the scope of our invention the construction, combination and arrangement substantially as set forth in the appended claims.

It is obvious that with this construction there is provided a connection for drill rods or the like, in which the one section of the rod is rigidly secured relatively to the other, and that the joint will not loosen by turning in the reverse direction, but is as rigid in one direction as in the other; that the bushing 3 will rigidly secure the two members together forcing the tapered portions of the two members together so that they are very rigid in their relation.

Having thus described our invention what we claim as new and desire to secure by Letters Patent is:—

1. A drill rod connection, including a hollow exterior member provided with an interior tapered portion provided with grooves in said tapered portion, and an internal thread in one end thereof, an internal member provided with a taper conforming to the taper in said external member and provided with outwardly extending lugs adapted to fit snugly into said grooves, and provided with an outwardly extending annular flange adapted to fit snugly against the shoulder formed at the upper end of the said tapered portion and a bushing threaded on its outer side adapted to be screwed between the exterior and interior connection members and fit against said flange.

2. In a drill rod connection, an external hollow member secured against torsional movement to a drill rod section and provided with an internally tapered flange portion provided with grooves in said tapered portion, an internal connection member provided with an annular flange intermediate its ends secured against torsional movement to another drill rod section and provided with a tapered end conforming to the taper in said external member and provided with outwardly extending lugs adapted to fit the grooves in said tapered flange portion, and a lock bushing of smaller exterior diameter than said external member adapted to be screwed into said external member and rest against the flange of said internal connection member whereby said members are rigidly secured together against torsional and lateral movement.

In testimony whereof, we have hereunto set our hands at San Diego, California this 13th day of June 1921.

WILLIAM H. PALMER.
EDWARD W. PALMER.